United States Patent
Armiroli et al.

(10) Patent No.: US 8,359,863 B2
(45) Date of Patent: Jan. 29, 2013

(54) MICRO-HYBRID SYSTEM WITH A PLURALITY OF STARTER-ALTERNATORS

(75) Inventors: Paul Armiroli, Marolles en Brie (FR); Jean-Claude Matt, Dijon (FR); Farouk Boudjemai, Marcoussis (FR); Julien Masfaraud, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 818 days.

(21) Appl. No.: 12/463,112

(22) Filed: May 8, 2009

(65) Prior Publication Data

US 2009/0288417 A1 Nov. 26, 2009

(30) Foreign Application Priority Data

May 23, 2008 (FR) ...................................... 08 53370

(51) Int. Cl.
   *F01B 21/04* (2006.01)
(52) U.S. Cl. ............ 60/711; 60/716; 60/719; 123/179.1
(58) Field of Classification Search .................... 60/706, 60/711, 716, 719; 123/179.1
   See application file for complete search history.

(56) References Cited

U.S. PATENT DOCUMENTS

| | | | | |
|---|---|---|---|---|
| 2,123,219 A | * | 7/1938 | Waseige | 60/709 |
| 4,421,217 A | * | 12/1983 | Vagias | 477/6 |
| 5,095,864 A | | 3/1992 | Bolenz et al. | |
| 6,179,247 B1 | * | 1/2001 | Milde, Jr. | 244/23 A |
| 6,935,115 B2 | * | 8/2005 | Anderson | 60/698 |

FOREIGN PATENT DOCUMENTS

| | | |
|---|---|---|
| FR | 2 874 658 A1 | 3/2006 |
| FR | 2 902 705 A1 | 12/2007 |
| WO | WO 02/46607 A1 | 6/2002 |

OTHER PUBLICATIONS

"Technology Valeo Stop-Start experienced by RATP on a Microbus Traverse the Bievre-Montsouris: When the bus stops, the engine also." Valeo, May 18, 2007, XP002513721, French original and English translation included.

* cited by examiner

*Primary Examiner* — Hoang Nguyen
(74) *Attorney, Agent, or Firm* — Berenato & White, LLC

(57) ABSTRACT

A micro-hybrid system (27) is connected to an on-board electrical network (V+) of a first heat engine (28) of a vehicle, whereby the first heat engine having a first cubic capacity which is greater than or equal to a first predetermined value. The system (27) comprises a number equal to two or more of identical starter-alternator devices (1) which are mechanically coupled to the first heat engine (28). The torque and power characteristics of each of the starter-alternator devices (1, 16), while not being adapted to the first heat engine (28), are adapted to a second heat engine having a second cubic capacity which is less than or equal to a second predetermined value equal to a fraction of the first predetermined value. The system is adapted to an application to large heat engines and allows a certain degree of standardization of starter-alternator devices.

9 Claims, 3 Drawing Sheets

MICRO-HYBRID SYSTEM WITH A PLURALITY OF STARTER-ALTERNATORS

This application claims benefit under 35 U.S.C.§119 of French Patent Application No. 08/53370 filed on May 23, 2008, which disclosure is hereby incorporated by reference.

TECHNICAL FIELD OF THE INVENTION

The present invention relates to a micro-hybrid system with a plurality of starter-alternators for a large cubic capacity vehicle heat engine.

TECHNICAL BACKGROUND OF THE INVENTION

Energy saving and pollution reduction considerations, particularly in urban surroundings, have led automotive vehicle manufacturers to equip their models with an automatic heat engine stop/restart system such as the system known as the "Stop and Go" system.

As discussed in VALEO EQUIPEMENTS ELECTRIQUES MOTEUR's French patent document FR 2 875 549, vehicles are rendered capable of functioning in "Stop and Go" mode by dint of a reversible electric machine, or starter-alternator, coupled to a heat engine supplied by an AC/DC converter in "starter" mode.

Under certain conditions, using a starter-alternator in the "Stop and Go" functional mode consists of causing the heat engine to stop completely when the vehicle itself is stopped, then restarting the heat engine subsequent, for example, to an action of the driver which is interpreted as a restart command.

A typical "Stop and Go" situation is that of stopping at a red light. When the vehicle stops at the light, the heat engine is automatically stopped, then when the light turns green, the engine is restarted using the starter-alternator following detection by the system of the clutch pedal being depressed by the driver or of any other action which is interpreted as meaning that the driver intends to restart the vehicle.

Essentially, such an automatic heat engine stop/restart system is currently provided on particular cars, but clearly there is an interest in generalizing its use to other types of vehicles for the purposes of saving energy and preserving the environment in a town driving situation.

A major source of pollution is constituted by utility vehicle engines, especially those of lorries, buses and other service or public transport vehicles.

Thus, it is natural to envisage installing a "Stop and Go" type system in such categories of vehicles in order to reduce their average fuel consumption and their polluting emissions.

The heat engines which equip such vehicles are large cubic capacity diesel or petrol engines, which demand the use of starter-alternators with specific torque and power characteristics which differ from those of the starter-alternators mounted on private small cubic capacity vehicles.

However, for obvious cost reduction reasons, designing a starter-alternator dedicated solely to starting large engines is to be avoided.

GENERAL DESCRIPTION OF THE INVENTION

Thus, the present invention aims to overcome this problem; more precisely, it provides a micro-hybrid system, connected to an on-board electrical network, of a first heat engine of a vehicle having a first cubic capacity which is greater than or equal to a first predetermined value.

This system is remarkable in that it comprises a number equal to two or more of identical starter-alternator devices which are mechanically coupled to the first heat engine. The torque and power characteristics of each of these starter-alternator devices, while not being adapted to the first heat engine, are adapted to a second heat engine having a second cubic capacity which is less than or equal to a second predetermined value equal to a fraction of the first predetermined value.

Preferably, the number of identical starter-alternator devices is greater than or equal to the inverse of this fraction, the compression ratios of the first and second engines being substantially identical.

In accordance with the invention, each of the starter-alternator devices advantageously comprises a starter-alternator connected to a reversible AC/DC converter connected to the on-board electrical network.

In one implementation of the invention, the on-board electrical network is connected directly to an on-board battery.

In another implementation of the invention, said on-board electrical network preferably comprises at least one ultracapacitor, and/or at least one DC/DC converter and/or at least one on-board battery.

In this other implementation, a DC/DC converter is advantageously connected to the ultracapacitor and to an on-board battery.

Benefit is also to be drawn from the fact that in accordance with this other implementation, the micro-hybrid system includes a regenerative braking function.

In both modes, each of the starter-alternators is advantageously independently coupled to the first heat engine, preferably via a belt.

These few essential specifications will make apparent to the skilled person the advantages of the invention over the prior art which has tended towards developing dedicated, large engine starter-alternators.

The detailed specifications of the invention are given in the description below which is made with reference to the accompanying drawings. It should be noted that these drawings are solely for the purposes of illustrating the text of the description and do not in any way constitute a limitation upon the scope of the invention.

DESCRIPTION OF PREFERRED EMBODIMENTS OF THE INVENTION

Figure 1:
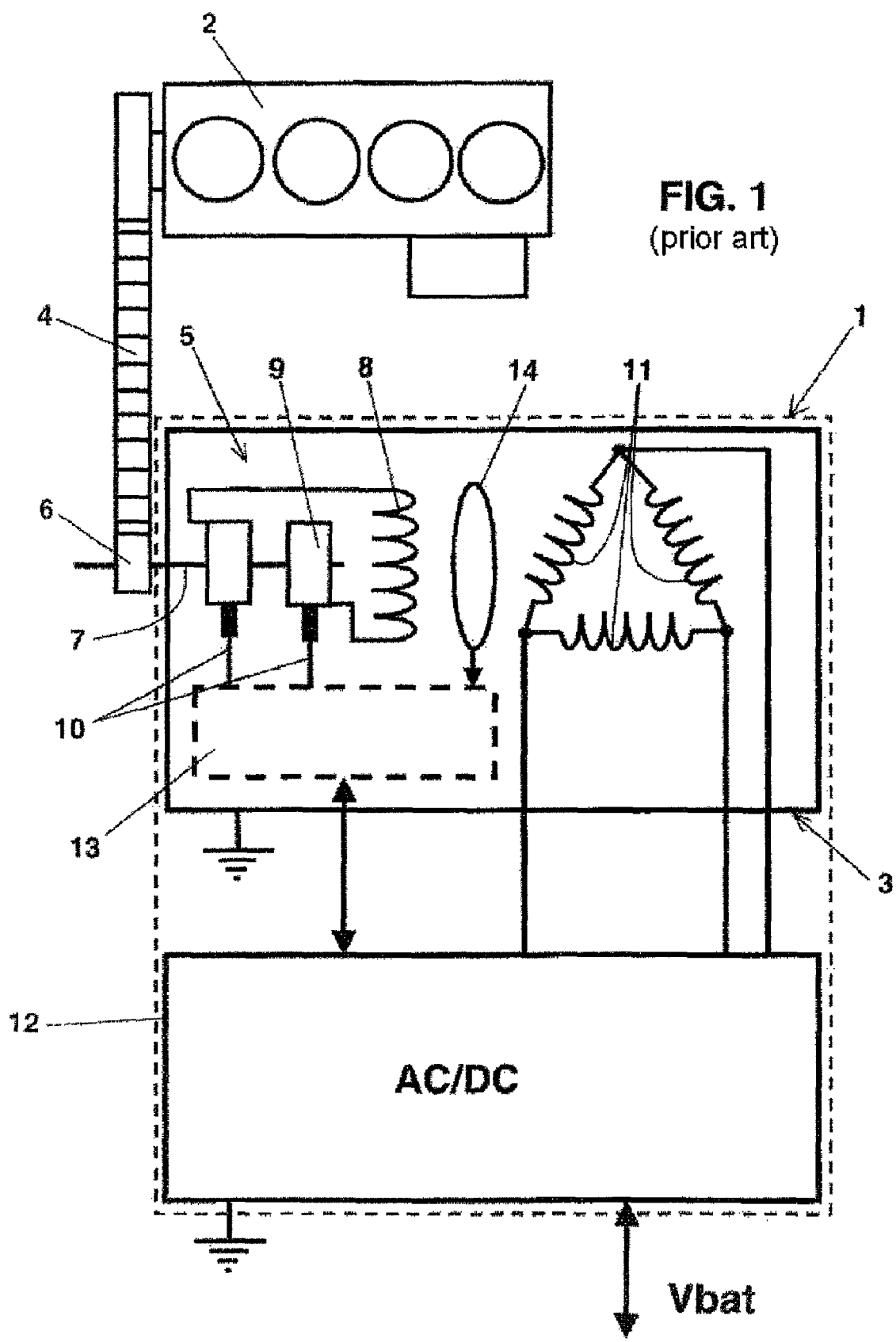
FIG. 1 is a diagrammatic representation of a known starter-alternator micro-hybrid system provided with an automatic stop/restart function for a small cubic capacity heat engine, the system being directly connected to an on-board battery.
Figure 2:
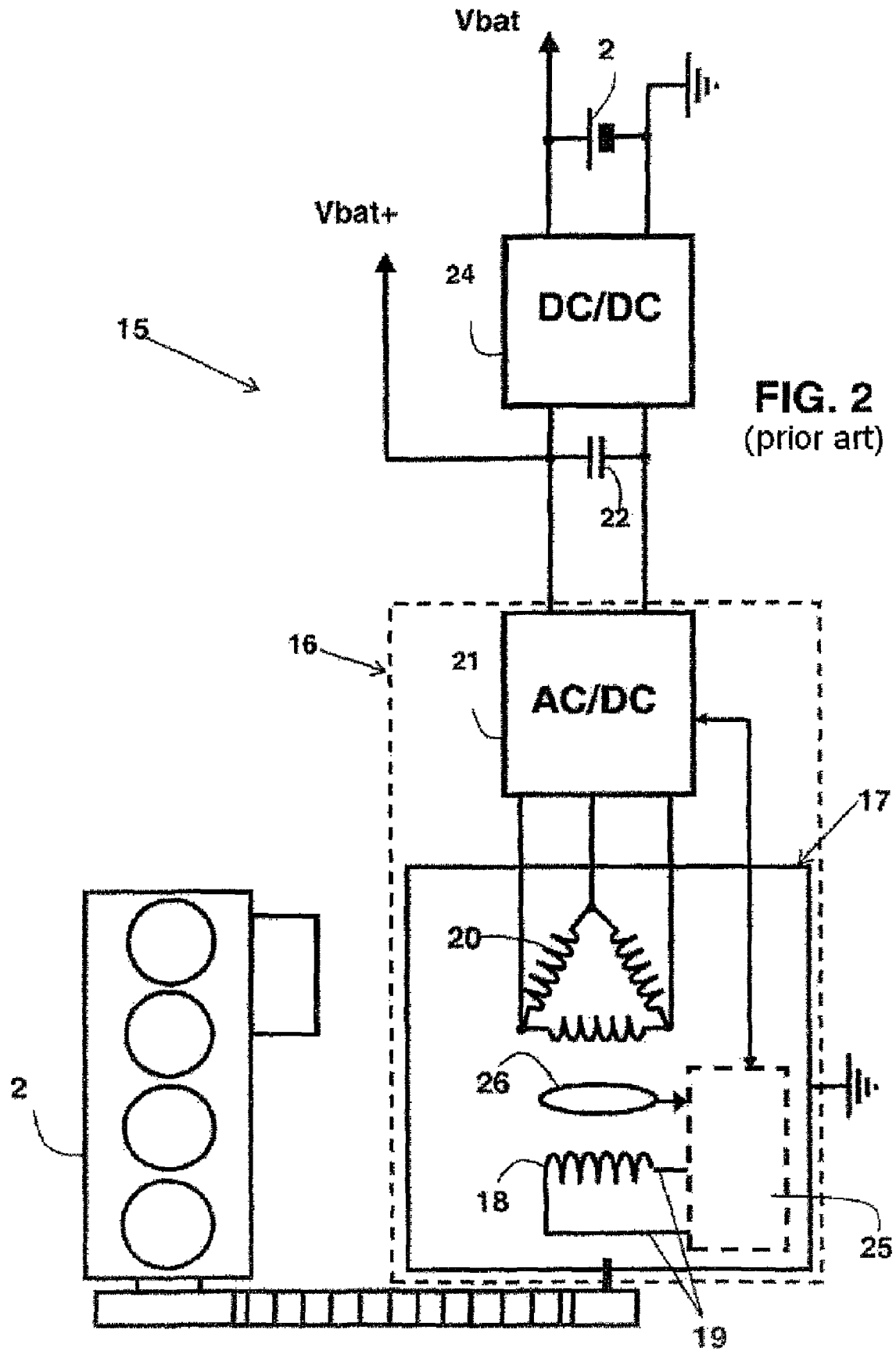
FIG. 2 is a diagrammatic representation of a known starter-alternator micro-hybrid system of the regenerative braking type provided with an automatic stop/restart function for a small cubic capacity heat engine.

The preferred embodiments of the invention concern vehicles equipped with a micro-hybrid system which can be equipped with an engine stop/restart function and with or without a regenerative braking device, as shown diagrammatically in FIGS. 1 and 2 respectively in the case of small cubic capacity engines.

FIG. 1 shows a micro-hybrid system 1 which is known per se, coupled to a vehicle heat engine 2 and connected directly to an on-board battery Vbat.

This system 1 comprises a starter-alternator 3 constituted by a reversible electric machine coupled to the engine 2 by means of a belt-and-pulley transmission 4.

The electric machine 3 comprises a rotor 5 which is fixed to an output pulley 6 at the end of a shaft 7. The rotor 5 has an inductor 8 supplied via a rotary commutator 9 by an excitation circuit 10.

The machine 3 also includes phase windings 11 or inductors supplied via an AC/DC converter 12.

A control circuit 13 controls the power circuits of the machine 3, constituted by the AC/DC converter 12 and the excitation circuit 10, depending on information supplied by a position sensor 14 for the rotor 5 and on control signals generated by an electronic control unit for the vehicle.

The electronic control unit receives the operating parameters for the engine 2 and other relevant information via dedicated wired connections or via an onboard CAN type data bus (not shown).

The AC/DC converter 12 is preferably constituted by a chopper circuit for the on-board supply voltage Vbat generating pulses, the frequency and width of which are controlled by the control circuit 13.

The chopper circuit 12 is a reversible AC/DC converter which functions in synchronous rectifier mode when the starter-alternator 3 functions in alternator mode.

A known example of a micro-hybrid system provided with a stop/restart function as shown diagrammatically in FIG. 1 and adapted for a 1.6 L diesel engine has the following characteristics:

power: 2.5 kW at 14V;
initial torque at 14V: 50 N.m.

A regenerative braking micro-hybrid architecture, also said to be of the "+X" type, with which the invention is also concerned, is shown in FIG. 2 in the case of small cubic capacity engines.

Like the micro-hybrid system shown in FIG. 1, the micro-hybrid system 15 comprises an assembly 16 constituted by a rotary electric machine 17 having an inductor 18 supplied by an excitation circuit 19, and phase windings 20 supplied by a reversible AC/DC converter functioning in inverter mode.

However, as opposed to the converter 12 provided on the conventional starter-alternator 3, the converter 21 is supplied via an ultracapacitor 22 instead of being connected directly to the on-board battery 23.

When functioning in generator mode, the electric machine 17 charges the ultracapacitor 22 via the reversible AC/DC converter 21 functioning in rectifier mode and supplies the on-board electrical network with a voltage Vbat+X which is, for example, in the range 18 to 24 V, which is higher than the voltage in the battery Vbat.

Energy conversion circuits 24 constituted by a DC/DC converter allow electrical energy to be exchanged between the on-board battery 23 and the ultracapacitor 22.

A control circuit 25 controls the excitation circuit 19 and the reversible AC/DC converter 21 depending on information supplied via a position sensor 26 for the rotor 18, and on control signals generated by an electronic control unit of the vehicle.

As is known per se, the micro-hybrid system 15 shown in FIG. 2 can provide a regenerative braking function: part of the mechanical braking energy transformed into electrical energy by the electric machine 17 functioning in generator mode is stored in the ultracapacitor 22 and is used, for example, to supplement the torque supplied to the heat engine 2 by causing the electric machine 17 to function in electric motor mode.

A known example of a micro-hybrid system provided with engine stop/restart and regenerative braking functions as represented diagrammatically in FIG. 2 and adapted to a 1.6 L diesel engine has the following characteristics:

power: 4.4 kW at 24 V;
initial torque at 24 V: 90 N.m.

In the case in which a starter-alternator system is to be mounted on a vehicle provided with a large heat engine, for example a 3.2 L cubic capacity diesel engine, the systems described above for small cubic capacity engines are not suitable as the required engine starting torque is generally more than 100 N.m.

The technical solution which consists of designing novel devices with torque and power characteristics which are adapted to heat engines in this category is not an optimum solution as it leads to new R&D costs.

Further, it is not certain whether magnetic saturation phenomena in known materials could reach the required starting torques given the small form factors of a single machine.

Figure 3A:
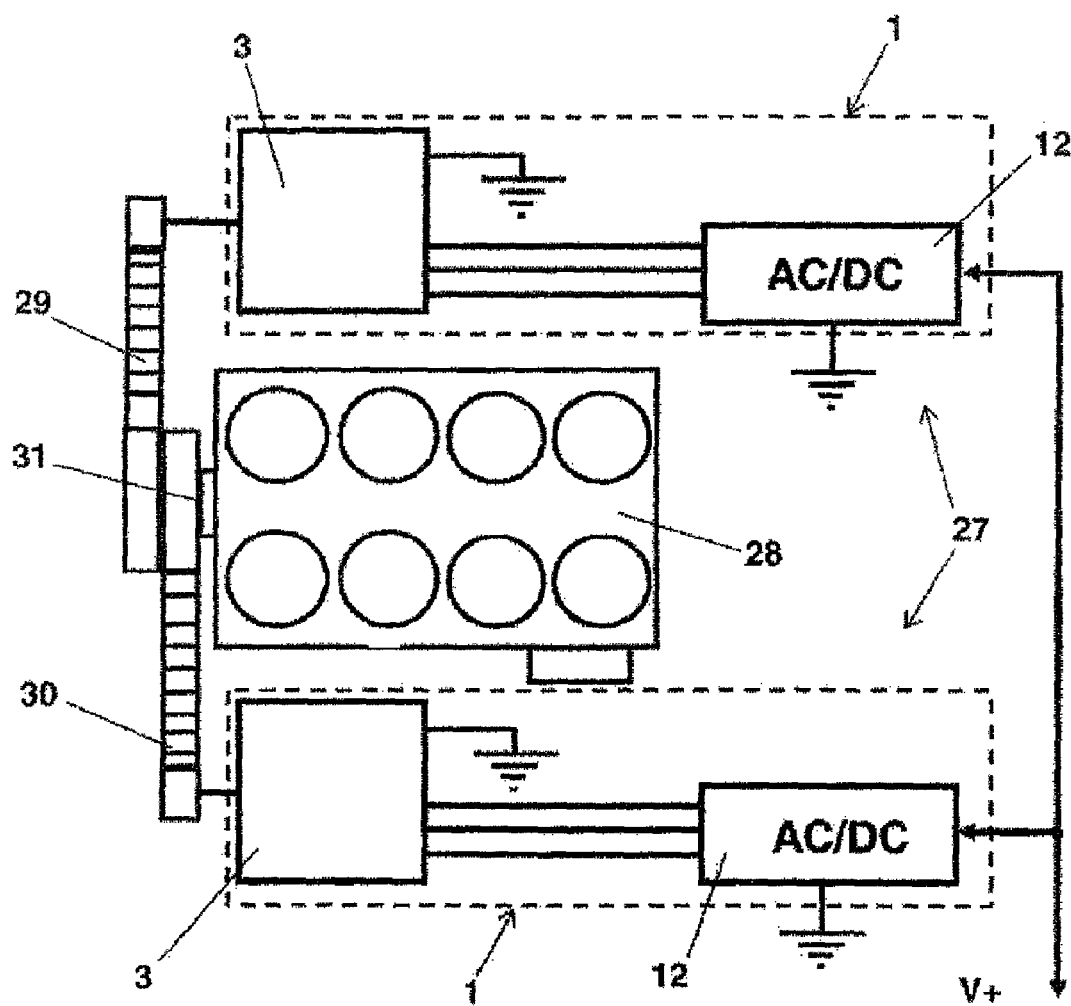
FIG. 3a is a diagrammatic representation in plan view of a micro-hybrid system with a plurality of starter-alternators in accordance with the invention for a large cubic capacity heat engine, comprising two identical starter-alternator devices.
Figure 3B:
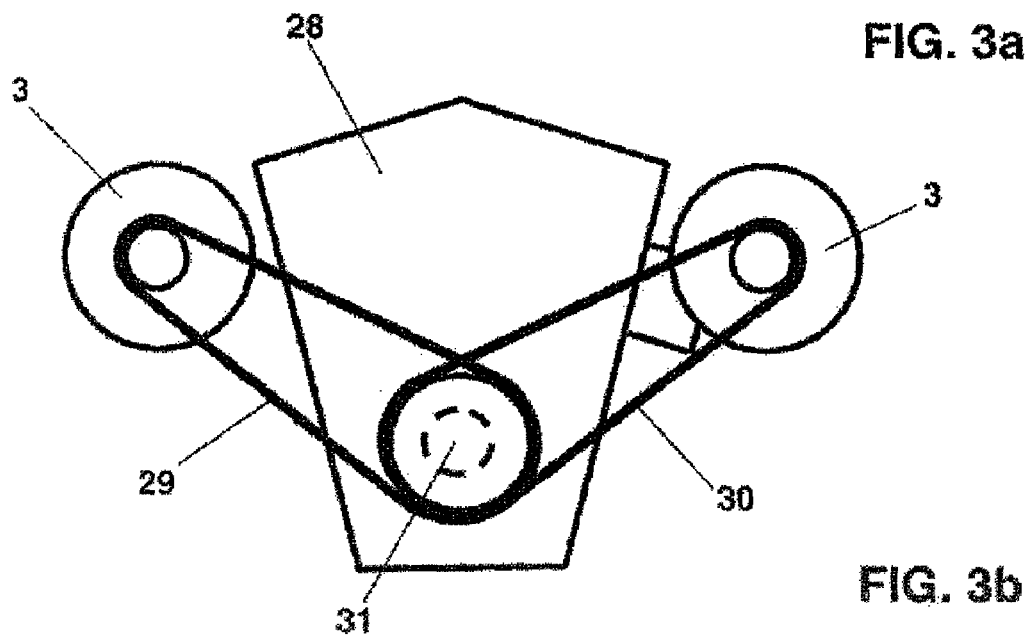
FIG. 3b is a diagrammatic representation in front view of a micro-hybrid system in accordance with the invention showing the mechanical coupling of two identical starter-alternators.

As can thus be seen clearly in FIGS. 3a and 3b, in accordance with the invention, it is proposed to constitute a micro-hybrid system 27 for a large cubic capacity heat engine 28 by mechanically coupling two identical starter-alternator devices 1 designed for a small cubic capacity heat engine 2, such as the starter-alternator devices 1, shown in FIG. 1, each adapted for the small capacity 1.6 L diesel engine and having the initial starting torque of 50 N·m at 14 V. Thus, each of the starter-alternator devices 1 for the small capacity 1.6 L diesel engine has the torque and power characteristics, such as the initial torque of 50 N·m, less than necessary to start the large cubic capacity heat engine (28), such as the large capacity 3.2 L diesel engine that requires the engine starting torque generally 100 N·m.

The two starter-alternators 3 equipping the starter-alternator devices 1 are mounted on two separate belts 29, 30 in order to sum the torques applied to the crankshaft 31 of the vehicle for restarting and to double the rate in alternator mode. For example, a sum of the torques of the two starter-alternator devices 1, each adapted to start the small capacioty 1.6 L diesel egine and having the initial starting torque of 50 N·m at 14V, is 2×50 N·m that equals to 100 N·m sufficient to start the large capacity 3.2 L diesel engine.

The two starter-alternators 3 equipping the starter-alternator devices 1 are mounted on two separate belts 29, 30 in order to sum the torques applied to the crankshaft 31 of the vehicle for restarting and to double the rate in alternator mode The system of the invention shown in FIG. 3a concerns both a first preferred embodiment in which the identical starter-alternator devices 1 are connected directly in parallel to an on-board battery and a second preferred embodiment of the invention in which identical starter-alternator devices 16 are connected in parallel to an on-board electrical network with a variable voltage of the "14+X" type.

The control signals generated by an electronic control unit of the vehicle are applied simultaneously to the control circuits 13, 25 of the mechanically coupled starter-alternators 3, 17.

In general, simultaneous control and diagnostic of the two identical starter-alternator devices 1, 16 is possible without complex wiring by dint of interfaces with the on-board bus, for example of the CAN type, with which these devices are originally provided.

In the second embodiment, the on-board electrical network preferably comprises an energy store 22 constituted by one or more very high capacity (or ultracapacity) EDLC capacitors; alternatively, however, the energy store may also be a Ni—MH type battery.

In the example of a vehicle provided with a 3.2 L large cubic capacity diesel engine that requires a minimum necessary 100 N·m starting torque, the two starter-alternator system examples cited above adapted for a 1.6 L small cubic capacity diesel engine and each having a starting torque of 50 N·m are together capable of constituting a suitable micro-hybrid system 27, since coupling them mechanically procures the minimum necessary 100 N.m starting torque.

The invention is not limited to coupling two starter-alternator devices; using the proposed solution, it is possible to put "Stop and Go" into vehicles intended for public transport, which are provided with very large cubic capacity diesel engines, for example 6 L.

It is also possible to employ regenerative braking economically on this type of vehicle based on an EDLC or a Ni-MH battery.

Furthermore, the invention has a significant competitive advantage in the marketplace for starter-alternator devices intended for private vehicles since it can result in economies of scale as regards the manufacturing costs for these devices by extending their market to utility vehicles, public transport vehicles and service vehicles.

Clearly, the invention is not limited to just the preferred embodiments described above.

On the contrary, the invention encompasses any possible variation in embodiment which falls within the scope of the accompanying claims.

The invention claimed is:

1. A micro-hybrid system (27) connected to an on-board electrical network (V+) of a heat engine (28) of a vehicle said system (27) comprising:
    two or more of starter-alternator devices (1, 16) each mechanically and independently coupled to said heat engine (28);
    each of said starter-alternator devices (1, 16) comprising a starter-alternator (3, 17) and a reversible AC/DC converters (12, 21) connected to said starter-alternator and to said on-board electrical network (V+);
    the torque and power characteristics of each of said starter-alternator devices (1, 16) being less than necessary to start said heat engine (28);
    a sum of the torques and power characteristics of said starter-alternator devices being sufficient to start said heat engine.

2. The micro-hybrid system (27) according to claim 1, wherein said on-board electrical network (V+) is connected directly to an on-board battery.

3. The micro-hybrid system (27) according to claim 1, wherein said on-board electrical network (V+) comprises at least one ultracapacitor.

4. The micro-hybrid system (27) according to claim 1, wherein said on-board electrical network (V+) comprises at least one DC/DC converter.

5. The micro-hybrid system (27) according to claim 1, wherein said on-board electrical network (V+) comprises at least one on-board battery.

6. The micro-hybrid system (27) according to claim 1, wherein said on-board electrical network (V+) comprises an ultracapacitor and a DC/DC converter connected to said ultracapacitor and to an on-board battery.

7. The micro-hybrid system (27) according to claim 3, further comprising a regenerative braking function.

8. The micro-hybrid system (27) according to claim 1, wherein each of said starter-alternators (3, 17) is independently coupled to said heat engine (28) via a belt (29, 30).

9. The micro-hybrid system (27) according to claim 1, wherein said starter-alternator devices are identical.

* * * * *